No. 668,087. Patented Feb. 12, 1901.
J. W. BROWN, Jr. & W. L. SCHELLENBACH.
TURRET LATHE.
(Application filed Aug. 2, 1900.)
(No Model.) 8 Sheets—Sheet. 2.

Witnesses:
Chas. D. Nou.
Frank L. A. Graham.

Inventors:
John W. Brown Jr, &
Wm. L. Schellenbach.
by their Attorneys.
Howson & Howson

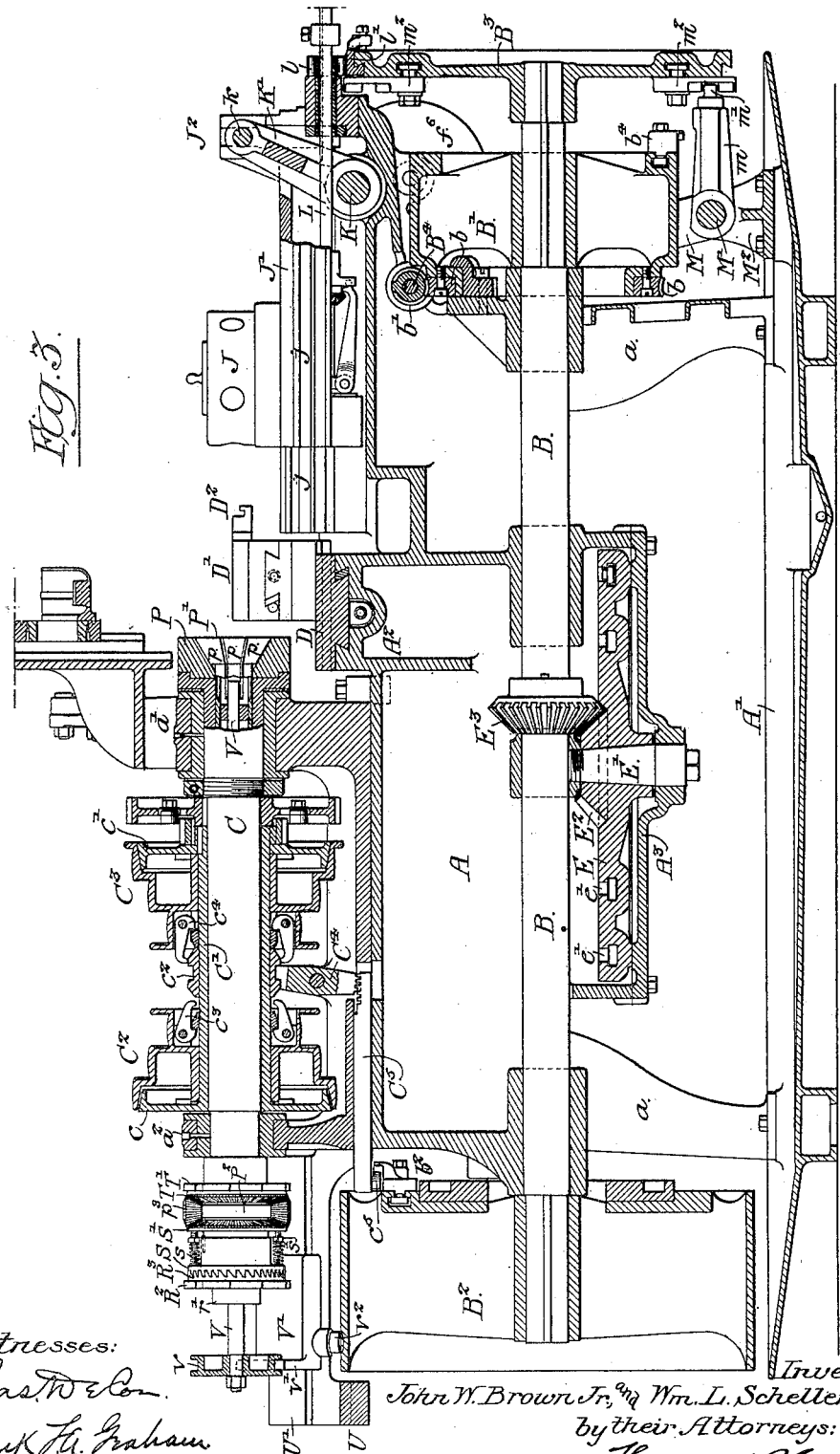

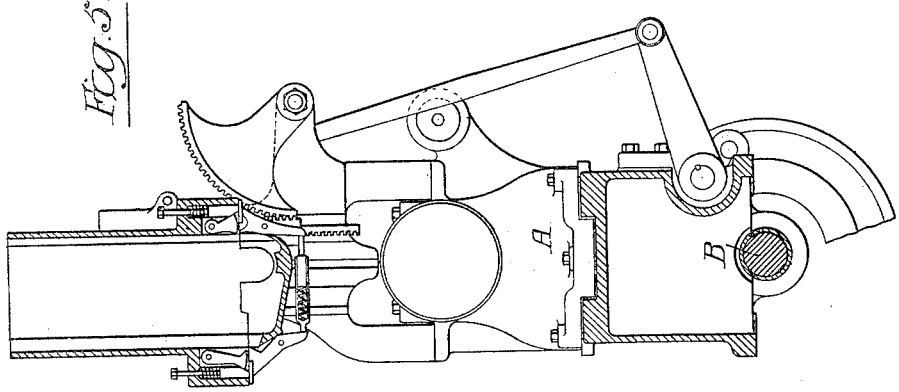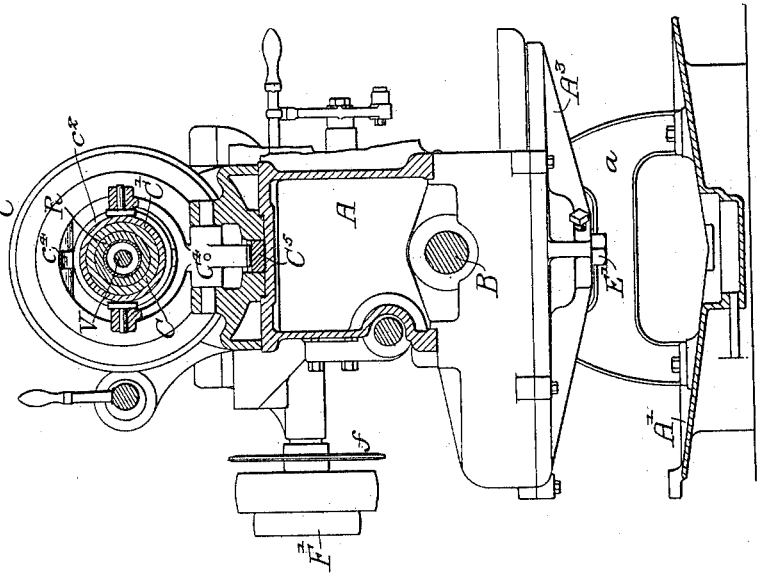

No. 668,087. Patented Feb. 12, 1901.
J. W. BROWN, Jr. & W. L. SCHELLENBACH.
TURRET LATHE.
(Application filed Aug. 2, 1900.)
(No Model.) 8 Sheets—Sheet 5.
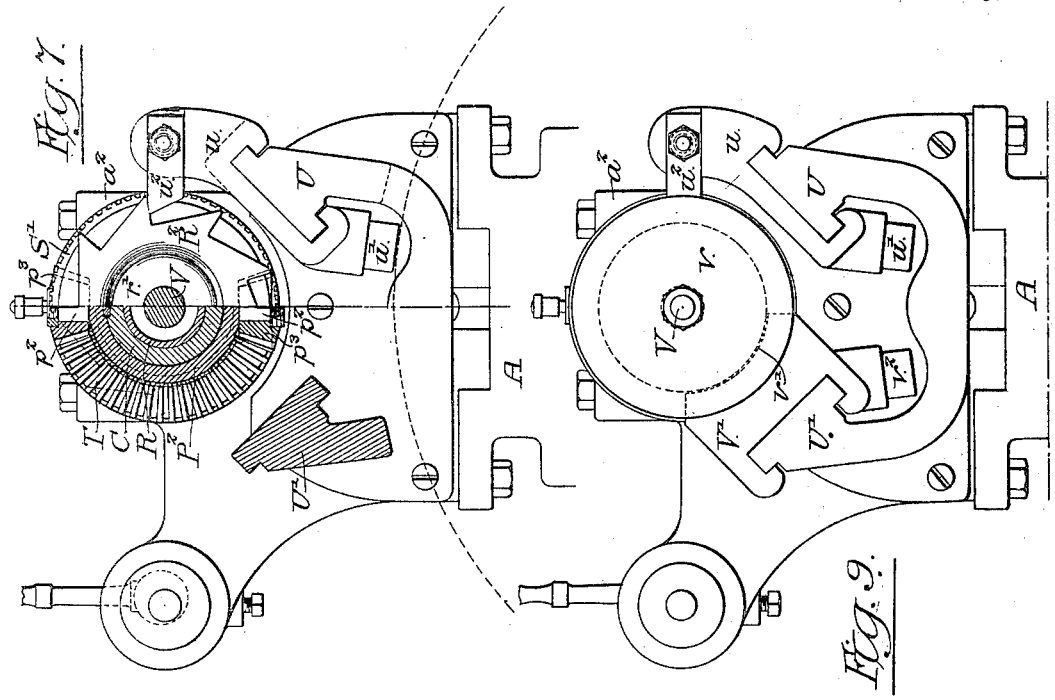
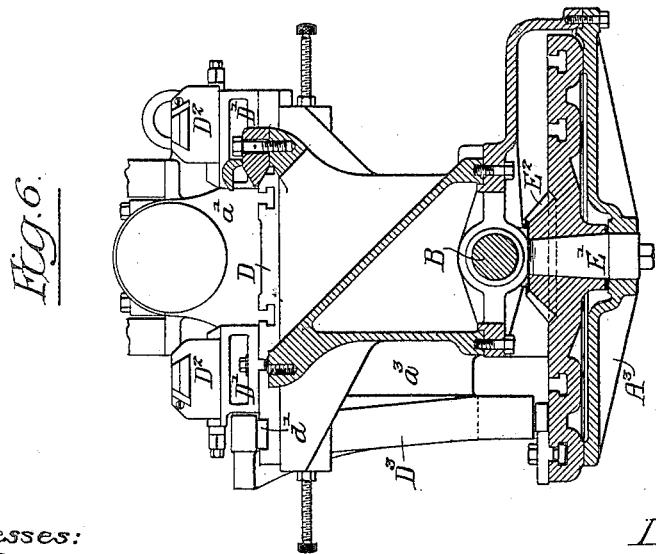
Witnesses:
Chas W Wilson
Frank F. A. Graham
Inventors:
John Wilson Brown Jr. and
William L. Schellenbach
by their Attorneys
Howson & Howson No. 668,087. Patented Feb. 12, 1901.
J. W. BROWN, Jr. & W. L. SCHELLENBACH.
TURRET LATHE.
(Application filed Aug. 2, 1900.)
(No Model.) 8 Sheets—Sheet 6.

Witnesses:
Chas. W. Cou.
Frank L. G. Graham.

Inventors:
John Wilson Brown Jr.,
and William L. Schellenbach
by their Attorneys.
Howson & Howson No. 668,087. Patented Feb. 12, 1901.
J. W. BROWN, Jr. & W. L. SCHELLENBACH.
TURRET LATHE.
(Application filed Aug. 2, 1900.)
(No Model.) 8 Sheets—Sheet 7.

Witnesses:
Chas. W. Olson
Frank H. Graham

Inventors:
John W. Brown Jr. & William L. Schellenbach, by their Attorneys
Howson & Howson No. 668,087. Patented Feb. 12, 1901.
J. W. BROWN, Jr. & W. L. SCHELLENBACH.
TURRET LATHE.
(Application filed Aug. 2, 1900.)
(No Model.) 8 Sheets—Sheet 8.
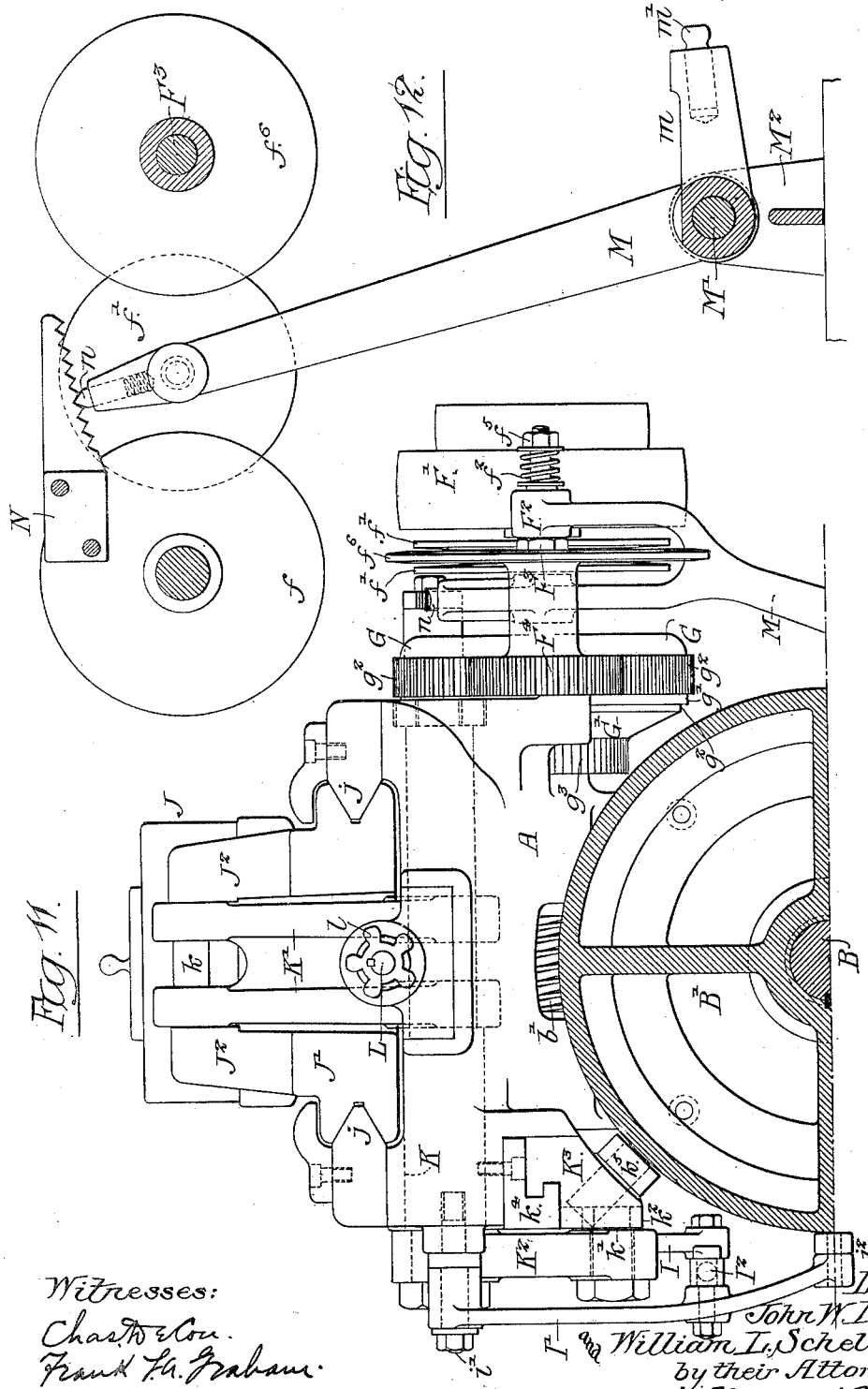

UNITED STATES PATENT OFFICE.

JOHN WILSON BROWN, JR., OF PHILADELPHIA, PENNSYLVANIA, AND WILLIAM L. SCHELLENBACH, OF CINCINNATI, OHIO, ASSIGNORS TO THE ENTERPRISE MANUFACTURING COMPANY OF PENNSYLVANIA, OF PHILADELPHIA, PENNSYLVANIA.

TURRET-LATHE.

SPECIFICATION forming part of Letters Patent No. 668,087, dated February 12, 1901.

Application filed August 2, 1900. Serial No. 25,674. (No model.)

*To all whom it may concern:*

Be it known that we, JOHN WILSON BROWN, Jr., a resident of Philadelphia, Pennsylvania, and WILLIAM L. SCHELLENBACH, a resident of Cincinnati, Ohio, citizens of the United States, have invented certain Improvements in Turret-Lathes, of which the following is a specification.

The main object of our invention is to improve the construction of turret-lathes whereby the article chucked can be completely finished in one machine without rechucking; and a further object of the invention is to improve the construction of the clutching mechanism, the means for reversing the chuck-spindle, and the means for moving the turret toward and from the work.

Figure 1:
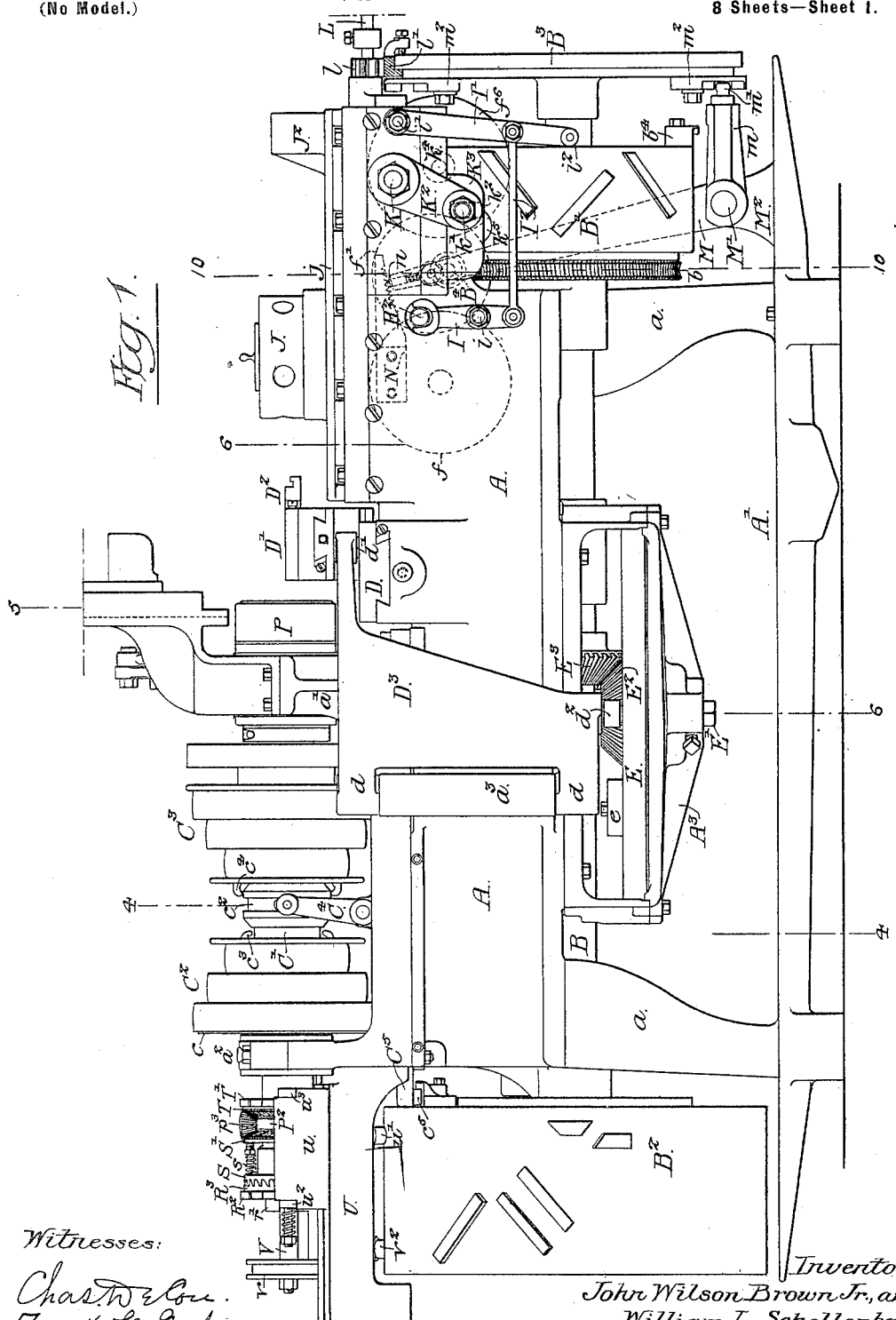
Figure 2:
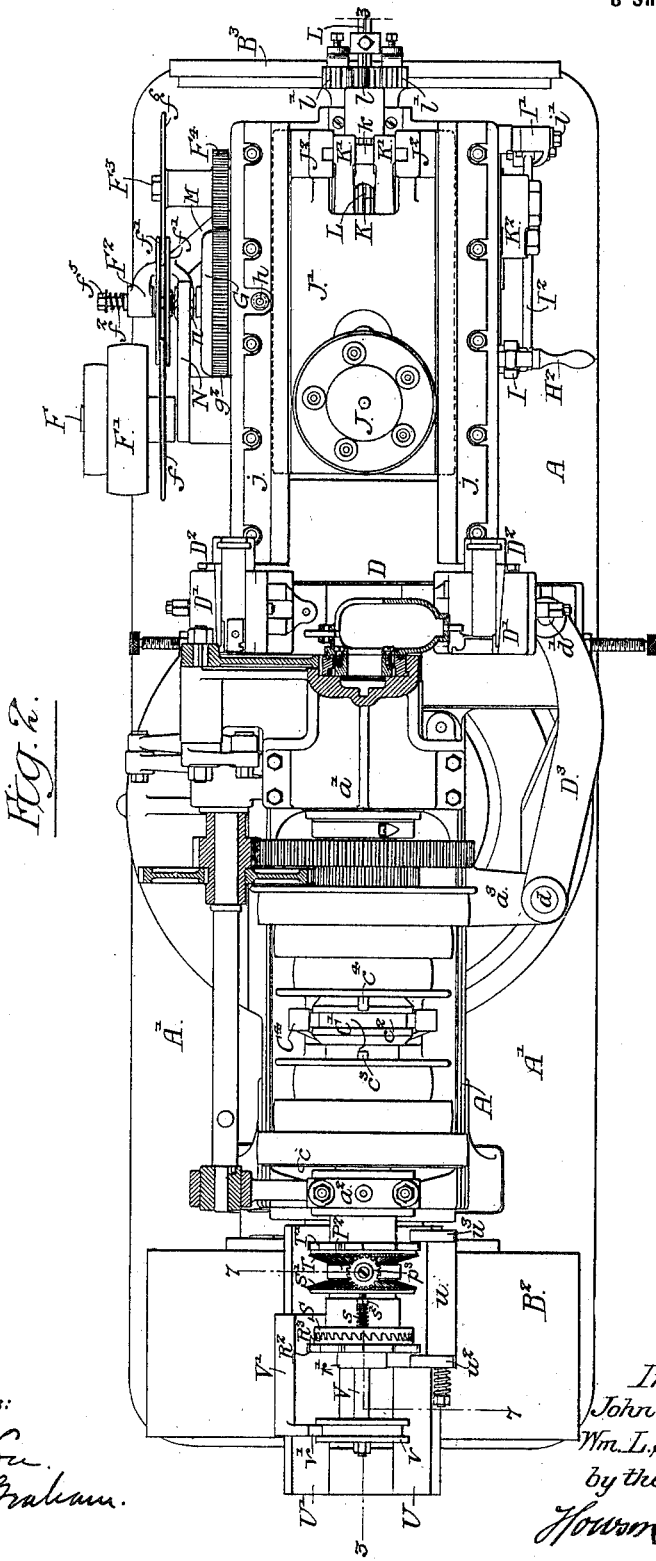
Figure 8:
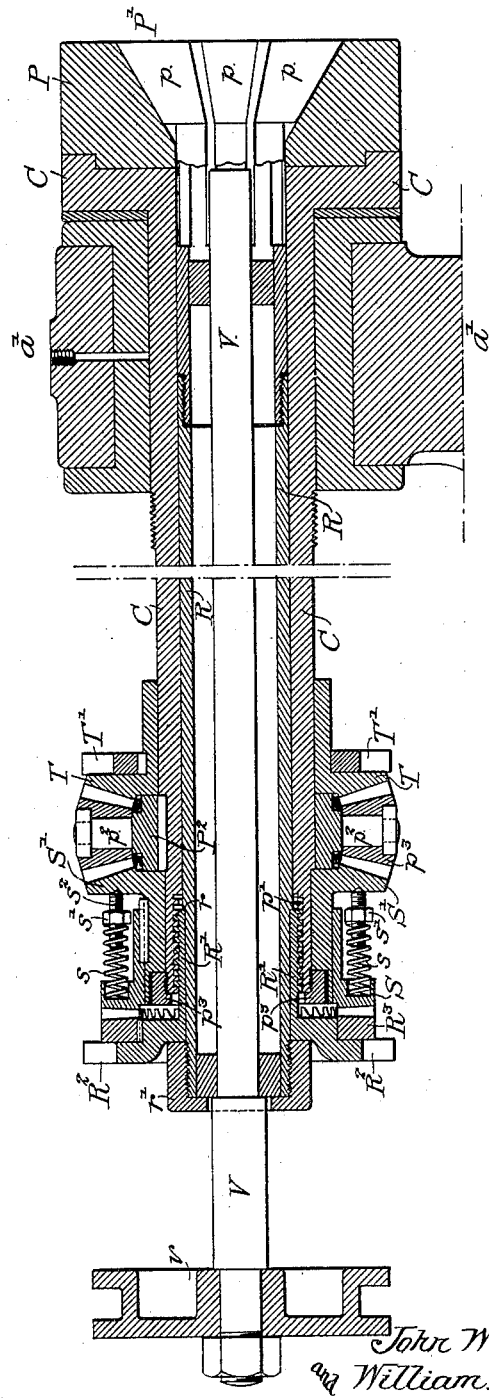
Figure 10:
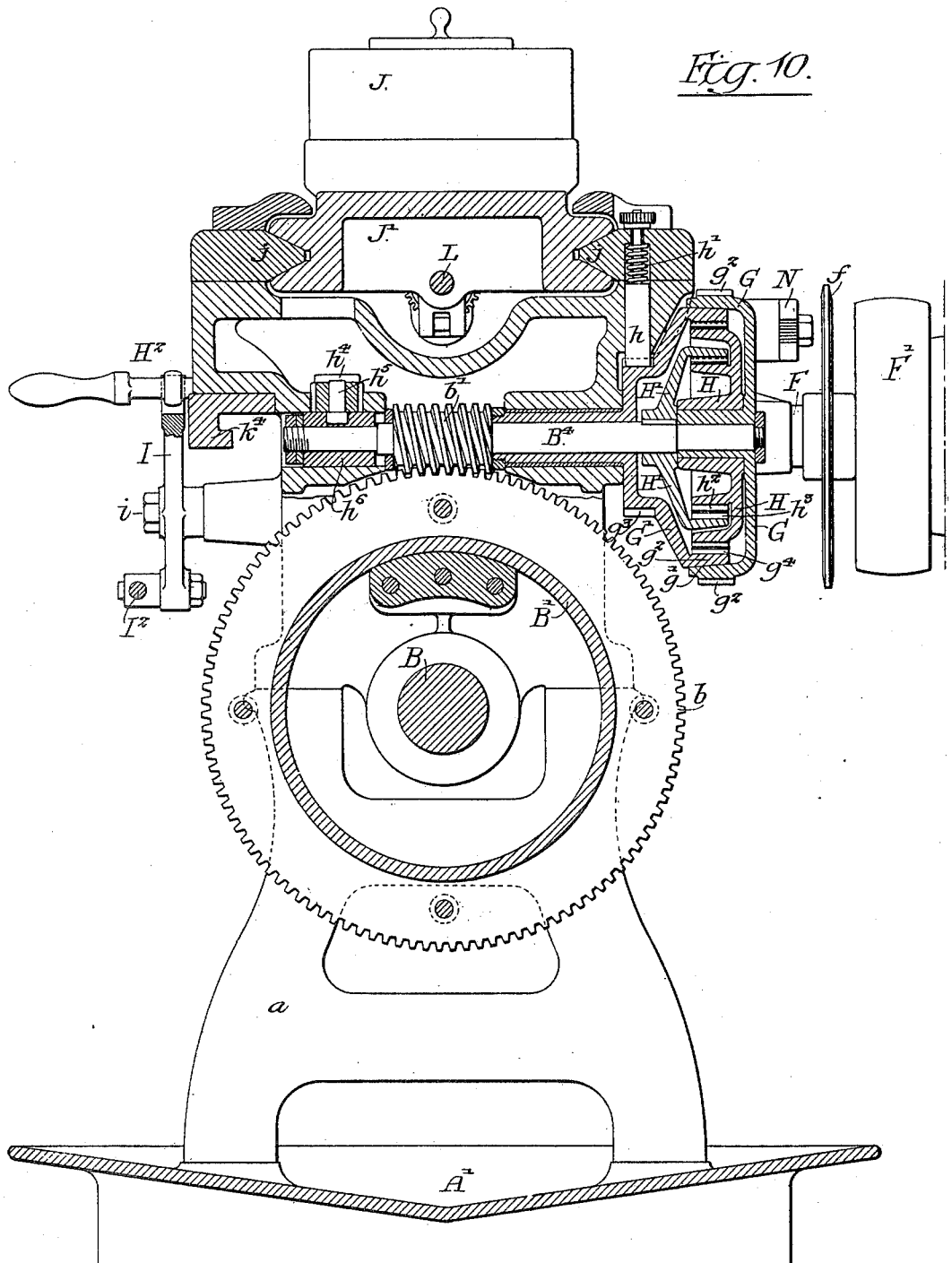

In the accompanying drawings, Figure 1 is a side view of a turret-lathe illustrating our improvements. Fig. 2 is a plan view with the hopper in section. Fig. 3 is a longitudinal sectional view on the line 3 3, Fig. 2. Fig. 4 is a transverse sectional view on the line 4 4, Fig. 1. Fig. 5 is a sectional view on the line 5 5, Fig. 1. Fig. 6 is a transverse sectional view on the line 6 6, Fig. 1. Fig. 7 is an enlarged sectional view on the line 7 7, Fig. 2. Fig. 8 is an enlarged longitudinal detail section of part of Fig. 3. Fig. 9 is an end view. Fig. 10 is a transverse sectional view on the line 10 10, Fig. 1. Fig. 11 is a rear end view with the drum in section, and Fig. 12 is a view of a detail of our invention.

The particular hopper shown in the present application is described and claimed in a companion application filed August 2, 1900, Serial No. 25,697, and the particular mechanism for rotating and holding the turret is also described and claimed in another application filed July 17, 1900, Serial No. 23,911. Therefore while we will describe these parts in connection with this machine we will not go into the details of construction.

Referring to the accompanying drawings, A is the frame of the machine, supported on suitable pedestals or legs $a\ a$. These legs in the present instance are secured to a base $A'$, which is flanged, forming a drip-catcher for the oil used on the machine.

B is the main shaft, mounted in bearings in the frame of the machine, and on this main shaft are drums $B'\ B^2$, one at one end of the machine and the other at the opposite end. On an extension of the shaft is a disk $B^3$, and on the drum $B'$ is a worm-wheel $b$, which meshes with a worm $b'$ on the cross-shaft $B^4$. The worm $b'$ is keyed to the shaft and must turn with it; but the shaft has a longitudinal movement within the worm as dictated by other mechanism which will be described hereinafter. The driving-shaft $B^4$ is actuated by mechanism which will also be described hereinafter.

C is a tubular spindle mounted in suitable bearings $a'\ a^2$, projecting from the frame A of the machine, and in this spindle is the mechanism which operates the clutch. On the spindle C is a sleeve $C'$, having a clutch-rim $c$ on one end, and secured to the opposite end is a duplicate clutch-rim $c'$, so that this sleeve is in the form of a spool. Mounted between the rims $c\ c'$ are two cone-pulleys $C^2\ C^3$, having clutch-faces. The clutch-face of the cone-pulley $C^2$ is arranged to come in contact with the clutch-face of the rim $c$, while the clutch-face of the pulley $C^3$ comes in contact with the clutch-face of the rim $c'$. Any suitable mechanism may be used to throw either one of these pulleys into contact with its rim. In the present instance we have shown a double-tapered collar $c^2$, which actuates levers $c^3\ c^4$, the lever $c^3$ being carried by the pulley $C^2$, while the lever $c^4$ is carried by the pulley $C^3$. The collar $c^2$ is actuated by a lever $C^4$, coupled to a rod $C^5$, mounted on the frame A, and this rod has a projection $c^5$, which is in the path of two cam-blocks $b^2$, adjustably mounted on the side of the drum $B^2$ in the present instance. One of these cam-blocks shifts the rod $C^5$ in one direction, and the other cam-block shifts it in the opposite direction, so that during one portion of the revolution of the shaft B the clutch-spindle is driven in one direction through the driving-pulleys $C^2$ and driven in the opposite direction by the driving-pulleys $C^3$. By this arrangement we are enabled to place the rough-cutting tool on one side of the machine and the finishing-tool on the other side of the machine. The hopper in this instance we prefer to place directly above the center of the chuck, so as to be clear of the cutting-tools.

$A^2$ is a transverse slideway, forming part of the frame of the machine in the present instance, and mounted on this slideway is the slide D, carrying the post D' for the roughing-tool and the post $D^2$ for the finishing-tool. We will not describe in detail the construction of the tool-posts, as they are of the ordinary construction for machines of this type, being longitudinally adjustable and so formed as to be actuated by the plunger of the turret when necessary. The slide D is moved by a lever $D^3$, pivoted at $d\ d$ to a bracket $a^3$ on the side of the frame A. In the present instance the arm of the lever $D^3$ has a slide-block $d'$, adapted to a transverse slot in the slide D, so that any motion imparted to the lever $D^3$ will be transmitted to the slide. On the bottom of the lever $D^3$ is a roller or other projection $d^2$, which is actuated by cam-pieces $e$ on the cam-disk E, mounted on a fixed spindle E', secured to a frame $A^3$, bolted to the body of the machine. This frame is clearly illustrated in Figs. 3 and 6.

In order that the cam-blocks may be adjusted on the disk E, we form in the present instance two annular undercut slots $e'$, in which are mounted the heads of the bolts for securing the cam-blocks to the disk. It will be seen that any number of cam-blocks may be mounted in any position desired on the disk for giving the slide carrying the tool-posts the desired motion, as it will be understood that the motion imparted to the slide will vary according to the article being finished in the machine.

In the present instance the disk E has a bevel-wheel $E^2$ integral with it, although in some instances the bevel-wheel may be a separate piece and secured to it, if desired.

$E^3$ is a bevel-wheel on the main shaft B, which meshes with the bevel-wheel $E^2$, so that the disk is rotated at the same speed in the present instance as the main shaft B.

We will now describe the mechanism for imparting motion to the main shaft B. As remarked above, this shaft is driven from a shaft $B^4$ through a worm and worm-gear $b'$ and $b$. On the stud F, projecting from the rear of the machine, is a cone-pulley F'. On the hub of this pulley is a friction-disk $f$, which is beveled near the edge, so as to enter between a pair of bevel-disks $f'$ on the stud $F^2$, mounted in suitable bearings on the machine. These disks are drawn toward each other by a spring $f^2$ on the stud $F^2$. The pressure of this spring can be increased or decreased by turning the nut $f^5$.

On a stud $F^3$ is a pinion $F^4$, having a long hub, and on the opposite end of the hub is a friction-disk $f^6$, similar to the friction-disk $f$, which is driven through the pair of disks $f'$ from the disk $f$. This construction is commonly known as the "Sellers" friction-gear. The pinion $F^4$ meshes with the gear-teeth $g^2$ of a wheel G, formed as clearly shown in Fig. 10. The hub of this wheel is loosely mounted on the shaft $B^4$. The inner surface of the rim of the wheel G is tapered, forming one face $g'$ of a friction-clutch. The other face $g^2$ is formed on the rim of a wheel G', having a long hub mounted in a suitable bearing in the frame of the machine, and through this hub the shaft $B^4$ passes.

On the wheel G' are ratchet-teeth $g^3$, with which engages a spring-stop $h$, mounted in a fixed bearing in the frame of the machine. Back of this stop $h$ is a spring $h'$, tending to force the stop into engagement with the ratchet-teeth.

On the wheel G' are internal gear-teeth $g^4$, which mesh with the teeth of an intermediate gear H. This gear is loose on the hub of the wheel G and has teeth $h^2$, which mesh in turn with teeth $h^3$ on the wheel H', keyed to the shaft $B^4$. This mechanism is what is commonly known as "differential gearing." In the present instance the speed is increased one to seventy, so that at one revolution of the wheel G the shaft $B^4$ will turn one-seventieth of a revolution so long as the friction-clutch between the wheel G and the wheel G' is disengaged.

The shaft $B^4$ can be moved longitudinally in its bearing, so as to either clutch the wheel G to the wheel G' or to free the wheel G from the wheel G'. In the first case the shaft will turn at the same speed as the wheel G, and in the second case it will be turned through the differential gearing. The shaft $B^4$ is moved in the present instance by means of a lever $H^2$, pivoted at $h^4$ to the frame of the machine, the short arm of this lever engaging a pin $h^5$ on the sleeve $h^6$, loose on the shaft $B^4$, but longitudinally confined thereto.

The end of the long arm of the lever $H^2$ is mounted in the fork of the lever I, pivoted at $i$ to the side of the machine and connected to an arm I', pivoted at $i'$. In the present instance the lever is connected to the arm by a connecting-rod $I^2$. The arm has a projection or roller $i^2$, which is operated by a cam-block $b^4$ on the rear of the drum B'.

J is the turret, mounted on a slide J'. This slide has V-shaped grooves in each side, and extending into the grooves are the ways $j\ j$, mounted on the frame of the machine. The slide extends to the rear of the turret and has two standards $J^2$, having vertical slideways.

K is a rock-shaft mounted in bearings in the frame of the machine, and secured to this rock-shaft is an arm K', having a pin $k$, which enters the slideways in the standards $J^2$. It will be noticed that the arm K' is so proportioned that the thrust will be about in line with the tool carried by the turret, avoiding any side strains upon the carriage and its ways. The rock-shaft K has an arm $K^2$, which has a pin $k'$ entering a slot $k^2$ in the slide $K^3$. This slide is mounted in a slideway formed by the frame of the machine and a detachable plate $k^4$. The slide $K^3$ has a roller $k^5$, which is acted upon by suitable cam-plates on the drum $B'$. These cam-plates are set according to the work.

The turret J on the slide is rotated by mechanism which is claimed in a separate application filed by John Wilson Brown, Jr., on the 17th day of July, 1900, Serial No. 23,911.

The turret-driving shaft L, which is carried by the slide, extends through a bearing on the frame of the machine and has a toothed pinion $l$ splined to it. This pinion is in the path of toothed segments $l'$, secured to the disk $B^3$ on the shaft B, so that the shaft B revolves the toothed pinion one revolution for each segment, and this motion will be imparted to the turret turning it, so as to present one tool and then another in line with the work.

In order to change the speed of the pinion $F^4$, we move the frame $F^2$, carrying the friction-disks $f' f'$ toward either the shaft F or the pinion $F^4$. The frame $F^2$ is carried by an arm M, which is secured to a rock-shaft $M'$, mounted in bearings $M^2$, secured to the base of the machine. Also carried by the rock-shaft is an arm $m$, having a pin $m'$, which is actuated by cam-plates $m^2$, adjustably secured to the disk $B^3$.

Secured to the frame of the machine is a toothed plate N, and carried by the frame $F^2$ of the arm M is a spring-pawl $n$, which engages with the teeth of the plate N and retains the frame and its disks in the position dictated by the cam-plates $m^2$ on the disk $B^3$. The pawl and the teeth on the plate N are so proportioned that while they hold the arm $m$ rigid after adjustment the arm can be readily adjusted by the cam-plates. Thus the disks $f'$ can be shifted automatically as desired by setting the cam-plate $m^2$ on the disk $B^3$.

We will now describe the means for automatically operating the chuck.

The spindle C is hollow, and secured to the end of this spindle is a head P, having a beveled inner surface.

$P'$ is the chuck, having a surface beveled to correspond with the inner surface of the head P, so that when the chuck is drawn into the spindle its sections $p$ will be drawn together, thereby clamping the article to be chucked.

Extending through the spindle C is a tube R. The end of the spindle C is threaded at $p'$, and meshing with these threads are the threads of a sleeve $R'$, confined between a shoulder $r$ on the tube R and the nut $r'$, screwed onto the end of the tube. The sleeve $R'$ carries a ratchet-wheel $R^2$, having nine teeth in the present instance, and also secured to the sleeve is a clutch-face $R^3$, having teeth which engage with the teeth of a spring-clutch S, which slides on the hub of a beveled gear-wheel $S'$. A spring $s$, confined between the clutch-face S and a nut $s'$ on the bolt $s^2$, tends to force the clutch-face S against the clutch-face $R^3$. There may be as many of these springs as desired. We have shown two in the present instance.

On the spindle C is keyed a ring $P^2$, having studs $p^2$—two in the present instance—carrying beveled pinions $p^3$, which mesh with the bevel-wheel $S'$ on one side and a bevel-wheel T on the opposite side. This bevel-wheel T is loosely mounted on the spindle C, and secured to the bevel-wheel T is a ratchet-wheel $T'$, having nine teeth, the same as the ratchet-wheel $R^2$. The bevel-wheel T is confined in position on the spindle between the ring $P^2$ and the bearing $a^2$, while the bevel-gear $S'$ is confined between the ring $P^2$ and a nut $p^3$, screwed onto the end of the spindle C.

Mounted on the slideway U, projecting from the frame of the machine, is a slide $u$, having a pin $u'$, which is within the path of cam-segments on the drum $B^2$, so that the slide can be shifted according to the position of the cam-segments. On the slide $u$ are two stops $u^2$ and $u^3$. The stop $u^2$ engages the toothed ratchet-wheel $R^2$ and the stop $u^3$ engages the ratchet-wheel $T'$.

When it is desired to clutch the article, the slide U is moved so that its stop $u^3$ will engage the ratchet-wheel $T'$ and prevent it from turning. Thus as the spindle C revolves, carrying the collar $P^2$, on which are the studs $p^2$ for the bevel-pinions $p^3$, the bevel-wheel $S'$ will be revolved in the same direction as the spindle, but at double the speed thereof, carrying with it the spring-seated clutch-face S, which engages with the clutch-face $R^3$, secured to the sleeve $R'$. By this means the sleeve $R'$ is screwed back, closing the chuck $P'$. This action will continue until the resistance to the further progress of the sleeve $R'$ becomes so great as to cause the clutch-faces $R^3$ and S to spring out of contact. By this means the pressure exerted at the chuck $B'$ is definitely determined by the tension of the springs S, so that pieces of varying diameter may be chucked without imposing upon the large one an excessive strain and at the same time imposing upon the smaller ones a sufficient strain. The slide $u$ is then moved so as to disengage the stop $u^3$ from the ratchet-wheel $T'$. As soon as the ratchet-wheel $R^2$ is released the clutching motion will cease and the article will be held clutched until released by the stop $u^2$ engaging the teeth of the ratchet-wheel $R^2$. As soon as this wheel $R^2$ is held the sleeve $R'$ will move in the spindle, and as it carries with it the tube R it will force the clutch $P'$ out of the head, and its spring-segments will expand and release the article clutched and allow it to fall. The operation may be reversed for clutching and releasing the piece, if desired.

Extending through the tube R is an ejector-rod V, which has at the rear end a grooved disk $v$, with which engages an arm $v'$ on a slide $V'$, adapted to a slideway $U'$, opposite to the slideway U. The slide $V'$ has a pin $v^2$, which is engaged by one or more cam-blocks on the drum $B^2$, so as to impart a longitudinal movement to the ejector-rod V. This ejector-rod may be used with a tool on the turret to hold the work and to act to carry the work into the clutch, and after the work has been chucked and turned it can be used to eject the work after the clutch has been released, or it may be simply used as an ejector.

It will thus be seen that we provide means which will automatically operate the chuck, so that the work can be automatically placed in the chuck and the chuck moved so as to grasp the work and hold it during the time the work is being acted upon by the tools and to automatically release the chuck and allow the work to fall immediately on the completion of the cutting operation, so that another piece of work can be automatically placed in the chuck.

We claim as our invention—

1. The combination of a frame, a chuck-spindle mounted in bearings on said frame, means for driving said spindle in either direction, shifting mechanism therefor, a turret in front of the chuck-spindle, means for operating said turret, a cross-slide between the turret and the chuck-spindle, tool-posts carried by said slide, one tool-post being on one side of the center and the other on the opposite side, a feed-hopper mounted above the chuck-spindle, means for feeding the blanks from the hopper to the chuck, substantially as described.

2. The combination of a lathe, a chuck-spindle, two driving-pulleys, one being driven in one direction and the other in the opposite direction, clutching mechanism for throwing either one of said pulleys into gear with the chuck-spindle, a chuck carried by said spindle, means for opening and closing said chuck, two tool-posts, one tool-post on one side of the center and the other on the opposite side, means for feeding the blanks to the chuck, the whole combined so that when the spindle is turned in one direction the roughening-tool carried by one tool-post is in action, and when the spindle is turned in the opposite direction the finishing-tool carried by the other tool-post is in action, substantially as described.

3. The combination in a lathe, of a chuck-spindle, means for turning said spindle, a slide, one or more tool-posts carried by said slide, a lever pivoted to the frame of the machine and connected to the slide, a cam-disk, and adjustable blocks on said disk actuating the said lever to move the slide, substantially as described.

4. The combination in a lathe, of the frame, a main shaft mounted in bearings on said frame, a cam-disk mounted on a vertical axis, gearing whereby the cam-disk is driven from the main shaft, blocks on the said cam-disk, a slide, tool-posts carried by said slide, a lever pivoted to the frame of the machine and connected to the slide and operated by the cam, blocks on the disk, with a spindle carrying the work, and means for driving the spindle, substantially as described.

5. The combination in a lathe, of a frame, a spindle mounted in bearings on said frame, two driving-pulleys, one driven in one direction and the other in the opposite direction, friction-clutch mechanism whereby either one or the other of the pulleys can be coupled to the spindle, so that the said spindle can be driven in either direction, a main shaft, a drum thereon, a shifting-lever for the friction-clutches, having teeth on one end, a rod also having teeth which mesh with the teeth on said lever, the rod being actuated by the blocks on the drum, substantially as described.

6. The combination in a lathe, of a frame, a hollow spindle mounted in bearings on said frame, two driving-pulleys for said spindle, one pulley being driven in one direction and the other in the opposite direction, clutch mechanism for clutching either one or the other of the pulleys to the spindle, a chuck carried at one end of the spindle, means for operating the chuck at the opposite end of the spindle, a main shaft, a drum on said shaft, with cam-blocks on the drum for actuating the chuck mechanism, with one or more tool-posts and means for operating the tool-posts, substantially as described.

7. The combination in a lathe, of a hollow spindle, a chuck mounted in the spindle, means for moving the chuck in either direction in the spindle, and means for controlling the movement in either direction, and a drum for actuating the said means, substantially as described.

8. The combination of a spindle, a chuck carried by the spindle, a tube extending through the spindle carrying the chuck at one end, a threaded sleeve longitudinally confined to the tube, the threads of the sleeve engaging with threads on the spindle, means for preventing the sleeve from turning, and means for turning the sleeve, substantially as and for the purpose specified.

9. The combination of a spindle, a chuck carried by the spindle, a tube extending through the spindle carrying the chuck at one end, a threaded sleeve longitudinally confined to the tube, the threads of the sleeve engaging with threads on the spindle, means for preventing the sleeve from turning so as to expand the clutch, and means for turning the sleeve so as to contract the clutch, substantially as described.

10. The combination of a tubular spindle having a head, a chuck mounted in said head, a rod extending through the spindle, a threaded sleeve confined longitudinally to the head, the threads of the sleeve meshing with threads on the spindle, a ratchet-wheel on the sleeve, a clutch-face also on the sleeve, a clutch, a gear-wheel carrying the said clutch, a sleeve on the spindle having a stud, a pinion on the stud meshing with the gear-wheel, and a wheel loose on the spindle and meshing with the pinion, and a ratchet-wheel carried by the said gear-wheel, and means for preventing one or other of the ratchet-wheels from turning so as to open or close the chuck, substantially as described.

11. The combination in a turret-lathe, of a slideway, a slide mounted in the said way, a turret carried by the slide, a rock-shaft, an arm extending from the rock-shaft and engaging the slide at a point about in line with the center of the tool carried by the turret, and means for actuating the rock-shaft to move the slide, substantially as described.

12. The combination in driving mechanism for turret-lathes, of a shaft, a wheel G mounted on said shaft, a second wheel G' mounted on the frame of the machine concentric with said shaft, the inner and outer faces, respectively, of said wheels forming the members of a conical friction-clutch, said wheel G having a hub mounted eccentrically to its bore, a wheel H' keyed to the shaft $B^4$ and having teeth, a loose double gear-wheel H mounted upon the eccentric-hub of the wheel G, one set of these teeth meshing with teeth on the wheel G', the other set meshing with the teeth on the wheel H', and means for drawing the wheel G toward the wheel G', means for drawing the wheel G into frictional contact with the wheel G' and removing them from frictional contact with each other, a worm on the shaft $B^4$, the main shaft B of the machine, a worm-wheel on said main shaft meshing with the worm, and a lever for controlling the position for moving the shaft $B^4$ longitudinally to release or clutch the wheels G, G', substantially as described.

13. The combination of a driving-disk and a driven disk of a turret-lathe, and intermediate disks in contact with said driving and driven disks, an arm carrying said intermediate disks, a driven shaft, a disk on the said shaft, cam-blocks on the said disk controlling the position of the intermediate friction-disks, substantially as described.

14. The combination of a driving and driven disks of a turret-lathe, intermediate friction-disks, an arm carrying said intermediate disks, a rock-shaft to which the arm is secured, a driving-shaft, a disk on the driven shaft having cam-blocks and a second arm on the rock-shaft with which the said cam-blocks engage, substantially as described.

15. The combination in a turret-lathe, of a spindle, a turret opposite the said spindle, a carriage on which the turret is mounted, mechanism for automatically moving the turret toward and from the said spindle, actuating pressure being applied by said mechanism approximately in line with the axis of the spindle, substantially as described.

16. The combination in a turret-lathe, of a spindle, a turret-slide, a turret mounted thereon opposite the spindle, a guideway on the turret-slide, a rock-shaft having an arm engaging the guideway approximately in line with the axis of the spindle, and means for driving the rock-shaft, substantially as described.

In testimony whereof we have signed our names to this specification in the presence of subscribing witnesses.

JOHN WILSON BROWN, JR.
WILLIAM L. SCHELLENBACH.

Witnesses to the signature of John Wilson Brown, Jr.:
WILL. A. BARR,
JOS. H. KLEIN.

Witnesses to the signature of William L. Schellenbach:
CHARLES F. DALLE,
WM. T. MCCULLOUGH.